US005361577A

United States Patent [19]

Cromer

[11] Patent Number: 5,361,577

[45] Date of Patent: Nov. 8, 1994

[54] SPRING LOADED CROSS-FIRE TUBE

[75] Inventor: Robert H. Cromer, Johnstown, N.Y.

[73] Assignee: General Electric Company, Schenectady, N.Y.

[21] Appl. No.: 149,470

[22] Filed: Nov. 9, 1993

Related U.S. Application Data

[63] Continuation-in-part of Ser. No. 25,734, Mar. 3, 1993, abandoned, which is a continuation of Ser. No. 729,602, Jul. 15, 1991, abandoned.

[51] Int. Cl.5 .................................... F02C 7/20

[52] U.S. Cl. ........................ 60/39.32; 60/39.37; 285/227; 285/399

[58] Field of Search .................... 60/39.32, 39.37; 431/286; 138/123, 127, 134, 138; 285/307, 219, 226, 227, 399

[56] References Cited

U.S. PATENT DOCUMENTS

| | | | |
|---|---|---|---|
| 856,839 | 5/1907 | Bickel | 285/399 |
| 1,049,542 | 1/1913 | Smith | 285/399 |
| 1,095,100 | 4/1914 | Fulton | 285/226 |
| 2,099,984 | 11/1937 | Lundquist . | |
| 2,209,239 | 7/1940 | Sterzenbach . | |
| 2,358,291 | 9/1944 | Fentress | 285/399 |
| 2,437,385 | 3/1948 | Halford | 60/39.37 |
| 2,729,938 | 1/1956 | McDowall et al. . | |
| 2,832,195 | 4/1958 | Weissborn, Jr. . | |
| 2,927,625 | 3/1960 | Rothermel et al. . | |
| 3,129,777 | 4/1964 | Haspert . | |
| 3,344,601 | 10/1967 | Mieczkowski, Jr. . | |
| 3,431,948 | 3/1969 | Goldenberg . | |
| 3,627,882 | 4/1972 | Hugoson . | |
| 3,991,560 | 11/1976 | DeCorso et al. | 60/39.32 |
| 4,091,063 | 5/1978 | Logan . | |
| 4,249,372 | 2/1981 | White . | |
| 4,610,468 | 9/1986 | Wood . | |
| 4,819,970 | 4/1989 | Umehara | 285/227 |
| 4,858,897 | 8/1989 | Irifune . | |
| 5,082,315 | 1/1992 | Sauer . | |
| 5,125,694 | 6/1992 | Gobbi . | |

FOREIGN PATENT DOCUMENTS

| | | | |
|---|---|---|---|
| 548057 | 10/1957 | Canada . | |
| 0069088 | 5/1949 | Denmark | 285/399 |
| 1966660 | 7/1973 | Germany . | |
| 2648384 | 6/1977 | Germany . | |
| 1601953 | 11/1981 | United Kingdom . | |

*Primary Examiner*—Richard A. Bertsch
*Assistant Examiner*—M. Kocharov
*Attorney, Agent, or Firm*—Nixon & Vanderhye

[57] ABSTRACT

A cross-fire tube for use in connecting adjacent combustors in industrial gas turbines includes a relatively flexible main spring body portion (12,50, 68, 76) extending between two end portions, each end portion including a connector (22, 26, 54, 72, 90) adapted to engage a collar portion of one of the respective combustors. Each of the connectors includes a plurality of spring loaded fingers adapted to engage at least an inside surface of a respective collar portion. When secured in place between adjacent combustor liner covers, the cross-fire tube is in axial compression. The main spring body may comprise a saw cut spring tube (12), a coil spring (52) covered by a wire reinforced ceramic fabric (66), a corrugated wire mesh fabric (70) heat treated to impart spring characteristics thereto; or a bellows type tube (76).

2 Claims, 4 Drawing Sheets

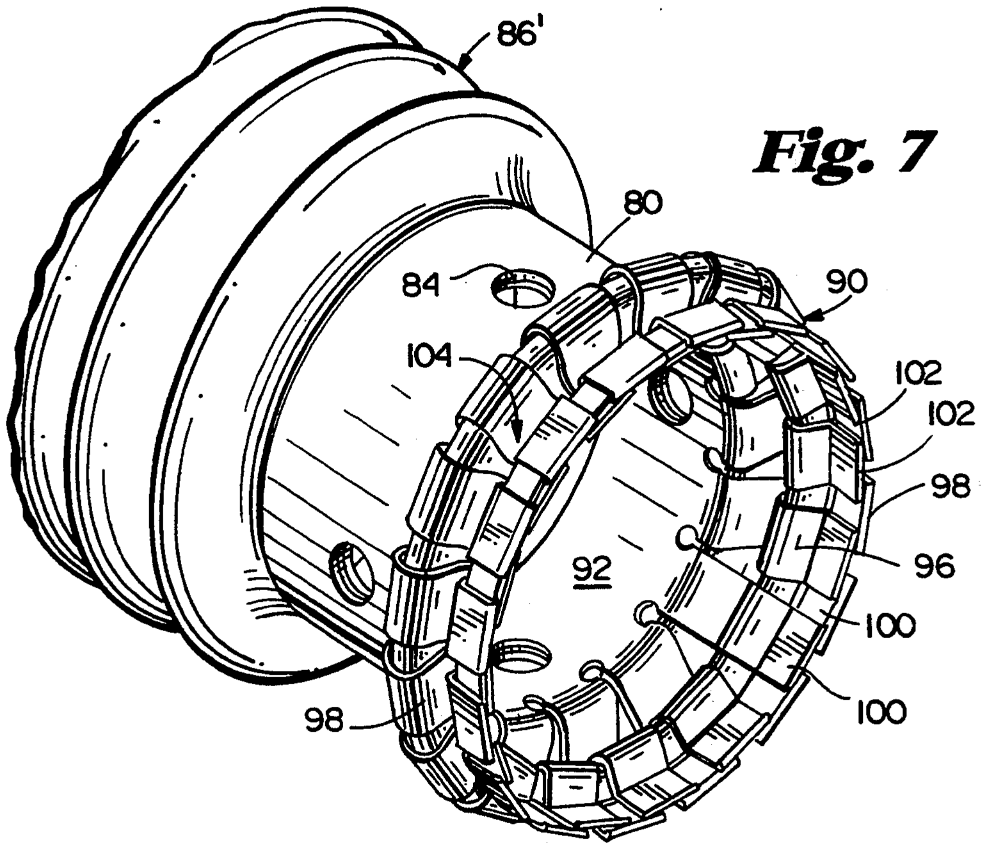
Fig. 7
Fig. 8
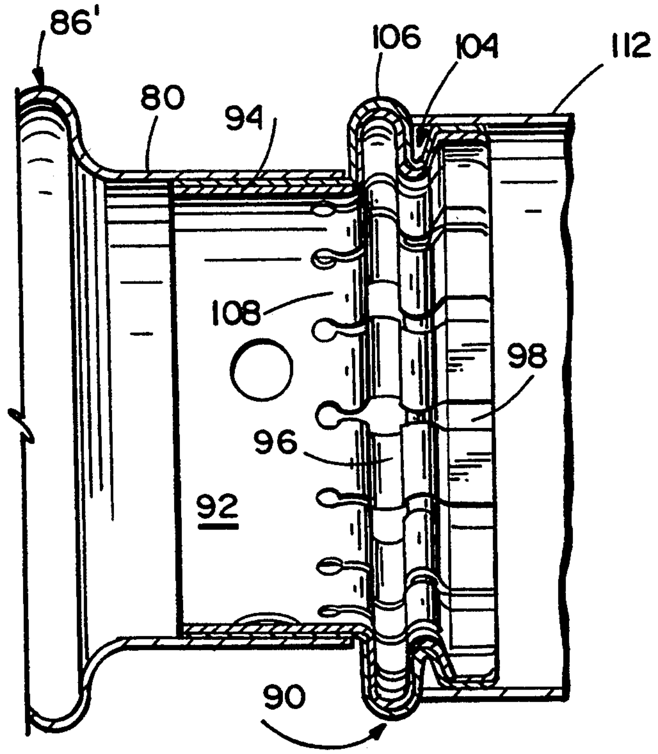

SPRING LOADED CROSS-FIRE TUBE

This application is a continuation-in-part of co-pending application Ser. No. 08/025,734, filed Mar. 3, 1993, now abandoned, which is a continuation of application Ser. No. 07/729,602, filed Jul. 15, 1991, now abandoned.

BACKGROUND AND SUMMARY OF THE INVENTION

This invention relates to cross-fire tubes utilized to connect adjacent combustors in a combustion apparatus, and more specifically, to cross-fire tubes which are to be secured between adjacent combustor liner collars in industrial gas turbines to insure substantially simultaneous ignition in all of the combustors.

Various constructions for cross-fire tubes are known in the field of combustion engineering. Examples of such constructions disclosed in the patent literature may be seen in U.S. Pat. Nos. 2,437,385; 2,729,938; 3,344,601 and 3,991,560.

Currently utilized cross-fire tubes exhibit undesirable wear at the interfaces between the tube and adjacent combustion liner collars due to vibration levels in the liners from combustion dynamic pressure fluctuations. In addition, heavy wear has been exhibited in the current cross-fire tube retainers and between the retainers and the combustion casings, combustion covers and/or combustion flow sleeves. As a result, cross-fire tubes and/or retainers must be replaced at relatively frequent intervals.

In response to such problems, solutions have been proposed based on a careful selection of materials and modifications of the methods of attachment of the cross-fire tube retainers. This methodology has resulted only in increasing parts life limited to current inspection intervals, so that both the cross-fire tubes and associated retainers continue to be considered consumable spares.

It is therefore the principal object of this invention to provide a new improved cross-fire tube construction having a longer service life and yielding longer service intervals by minimizing or eliminating friction wear at all liner collar/cross-fire tube interfaces. This is accomplished in the present invention by providing a cross-fire tube having a main body and end connectors which are flexible and spring loaded in axial and radial directions, respectively. By this arrangement, a spring clamping force between the cross-fire tube and the combustion liner collar is provided which is greater than the friction forces generated due to inertial effects and vibration. In other words, the amplitude of the vibration portion of the loading is absorbed by the spring action of the cross-fire tube itself.

More specifically, and in a first exemplary embodiment of the invention, a spring loaded cross-fire tube is provided which includes a flexible main body portion which is generally tubular and substantially cylindrical in shape, provided with a series of staggered circumferential saw cuts to thereby provide a flexible and compressible spring body. At either end of the main spring body portion, there is a connector portion which includes an integral, inner sleeve which is provided with a series of circumferentially spaced, axial cuts to thereby form a plurality of annularly arrayed spring fingers which are configured so as to apply a radially outwardly directed force against an inside surface of the combustion liner collar when the connector is inserted within the latter. In this first exemplary embodiment, each connector portion of the cross-fire tube also includes an outer connector sleeve which is also provided with a plurality of circumferentially spaced axial cuts to form a second set of spring loaded fingers which are configured to apply a radially inwardly directed force against an outside surface of the liner collar. With the combustor liner collars inserted or received within, i.e., between, the first and second sets of fingers at each end of the main spring body, spring forces are thus exerted in opposite radial directions against both inside and outside surfaces of the collar to firmly secure the cross-fire tube in place between adjacent collars. In the assembled state, the main spring body is also loaded in axial compression.

It is another feature of this first exemplary embodiment that the main spring body is covered by a thin metal pressure cover or sleeve in concentric relation thereto, with contact between the sleeve and the main spring body portion occurring at opposite ends of the cover (adjacent the connectors), and at a point approximately midway between the ends of the cover where the latter is tack welded to the main spring body.

The cross-fire tube as described allows compression and expansion of the main spring body, as well as flexing action of the main body and the connector portions during operation to thereby eliminate or at least minimize friction wear caused by relative sliding movement at the cross-fire tube/liner collar interfaces.

In a second exemplary embodiment of the invention, the main spring body portion of the cross-fire tube comprises a substantially cylindrical coil spring, covered by a fabric woven from steel wires and ceramic threads.

The ends of the coil spring are secured at opposite ends to connector sleeves which are designed to be inserted within respective combustor liner collars. In this second exemplary embodiment, the connector sleeves are axially cut about their respective peripheries to form a sets of spring fingers which exert radially outwardly directed forces against inside surfaces of the collars. Unlike the first described embodiment-, no outer connector sleeves are required.

In a third exemplary embodiment of the invention, the main spring body portion of the cross-fire tube comprises a wire mesh fabric which has been shaped as a corrugated sleeve or bellows and then heat treated so as to maintain the shape at high temperatures. The bellows or corrugated shape imparts spring characteristics to the main body portion, thus permitting the cross-fire tube to expand, contract, and flex under operating conditions. The wire mesh fabric also permits transpirational cooling of the cross-fire tube to thereby prolong its service life. As in the second exemplary embodiment, the main body portion has secured at opposite ends connector sleeves which include a plurality of spring loaded fingers adapted to exert radially outwardly directed forces against the inside surfaces of the combustor liner collars.

In a fourth (and preferred) embodiment, the cross-fire tube comprises a metal, tubular bellows with connectors at each end, the connectors including annular arrangements of radially inner and outer spring fingers in circumferentially overlapping relationship. These end connectors are designed to receive the liner collars in telescoping relationship so that the cross-fire tube exerts both axial and radial outward forces on the collar. The stiffness or spring rate of the bellows is such that any vibratory movements of the liner collars are taken up by the bellows in high cycle fatigue, thereby substantially reducing wear at the tube/liner collar interfaces.

It will be appreciated that in each of the above described embodiments, the length of the cross-fire tube exceeds the distance between the liner collars to thereby insure compressive spring loading of the cross-fire tubes when assembled in place.

Thus, in its broader aspects, the present invention comprises a cross-fire tube for attachment to liner collars of adjacent combustors in a combustion apparatus comprising an elongated, axially elastically compressible and substantially cylindrical body having connecting portions at either end thereof, each connecting portion including first spring means including a plurality of circumferentially spaced spring fingers for exerting radially outwardly directed spring forces at least against inside surfaces of the liner collars.

The above described exemplary embodiments of the invention provide longer service intervals for cross-fire tubes by reason of the multiple spring loading characteristics thereof which eliminate the relative motion and wear between the cross-fire tubes and associated combustion liners. The selection of stiffness values for the main body and connector portions of the cross-fire tubes described above is carried out so that the tubes will flex or bend, or compress or expand before any relative frictional movement occurs. In combination with the proper selection of materials as disclosed herein with respect to the cross-fire tube body and associated connector portions, excellent high cycle fatigue life can be expected and, since the cross-fire tube connectors exert radially outwardly directed spring forces, no cross-fire tube retainers are required, thereby eliminating another source of wear in conventional cross-fire tubes.

Other objects and advantages of the invention will become apparent from the detailed description which follows.

BRIEF DESCRIPTION OF THE DRAWINGS

FIG. 7 is as partial perspective view of the cross-fire tube shown in FIG. 6;

FIG. 8 is a partial side section of the cross-fire tube shown in FIG. 6.

DETAILED DESCRIPTION OF THE DRAWINGS

Figure 1:
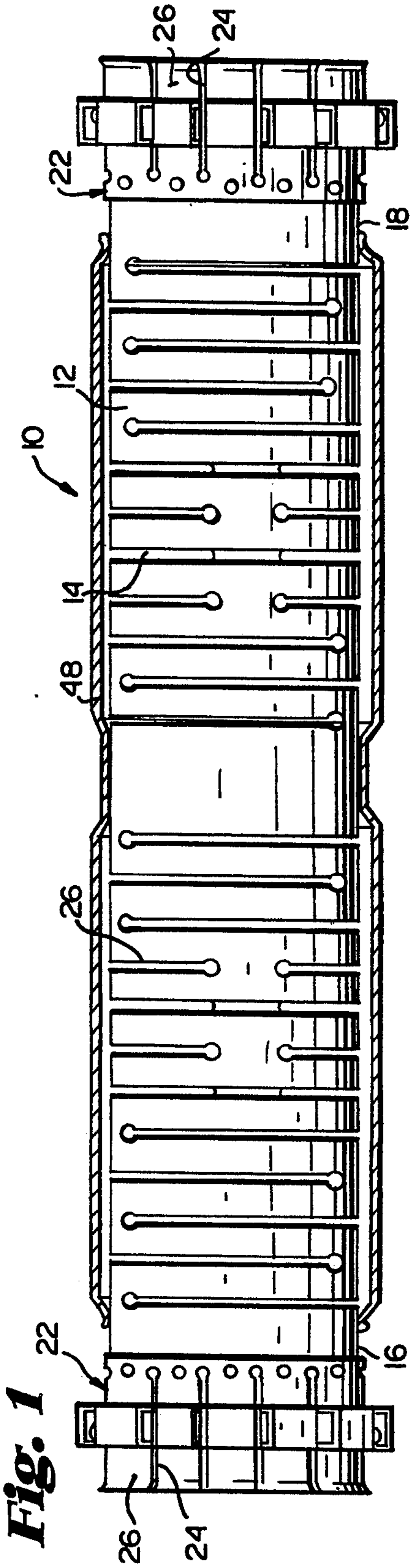
FIG. 1 is a side view of a cross-fire tube in accordance with the first exemplary embodiment of the invention.

With reference to FIG. 1, a first exemplary embodiment of the invention includes a cross-fire tube construction 10 having a main body portion 12 formed preferably by a relatively thin (e.g., 032″) X-750 sheet steel formed to a tubular shape with a plurality of partially annular saw cuts, circumferentially staggered along the length thereof. The partially annular saw cuts each have a width of about 0.062″ with an axial spacing of about 0.375″ between adjacent cuts.

Figure 3:
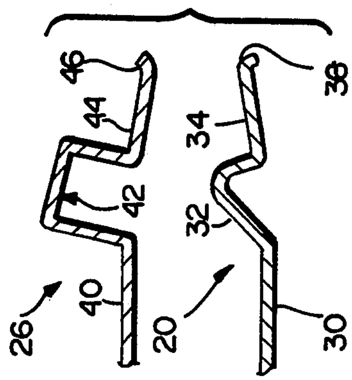
FIG. 3 is a partial enlarged detail of the first and second connector elements at each end of the cross-fire tube illustrated in FIGS. 1 and 2 in an unassembled stage.
Figure 2:
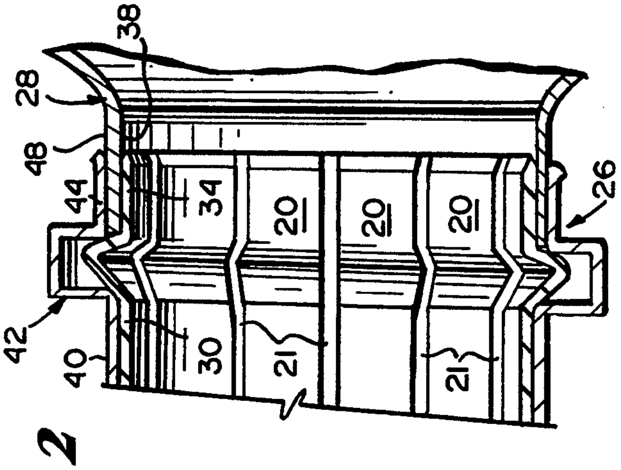
FIG. 2 is a partial side view illustrating the manner in which the cross-fire tube illustrated in FIG. 1 is attached to an associated combustion liner collar.

The hollow, tubular main body 12 has opposite end portions 16, 18 including an axial extent without the saw cuts, but which terminate in a plurality of annularly aligned spring fingers 20 (see FIGS. 2 and 3). These fingers are formed by a series of circumferentially spaced, axially extending cuts or slots 21, with each finger 18 having a cross sectional length as shown best in FIG. 3.

A pair of outer sleeves 22 which may be constructed of similar material as the main body 12, are slidably received over the end portions 16, 18 of the main body portion 12. These outer sleeves are secured, preferably by welding, to the end portions 16, 18 of the main spring body portion 12 at locations intermediate the axial cuts or slots therein and annular cuts 14.

The outer sleeves 22 are also provided with axially extending slots or cuts 24 to form a second set of spring fingers 26 which, as described further below, cooperate with the first set of spring fingers 18 to resiliently clamp a liner collar 28 therebetween.

With reference now to FIG. 3, cooperating inner and outer spring fingers of the main body end portion 18 and the sleeve 22 are illustrated. Each of the spring fingers includes a relatively straight, i.e., axial, portion 30 which merges with a rounded bead 32 which, in turn, merges with an angled portion 34 and terminates at an outwardly directed tip 36. This configuration spring biases the fingers 20 radially outwardly, so that when compressed and frictionally engaged within the liner collar, the fingers 20 exert a radially outwardly directed force against the inside surface 38 of the liner 28. At the same time, the outer sleeve spring fingers 26 each includes a relatively straight, i.e., axial, portion 40, an angled bead or flange 42, and an inwardly tapered portion 44 terminating in a radially outwardly extending tip 46. This arrangement biases the sleeve 38 radially inwardly so that when the liner collar 28 is received between portions 34 and 44, the outer spring finger 26 will exert a radially inwardly directed force against the outside surface 48 of the liner collar. Thus, the cross-fire tube 10 will be clamped in place by radially opposed spring forces, while nevertheless accommodating slight misalignments between the cross-fire tube and adjacent liner collars 28. It will be appreciated that the oppositely directed tip portions 36, 46 facilitate sliding movement of the cross-fire tube over the combustion liner collar 28 upon initial assembly.

The manner in which the spring loaded cross-fire tube shown in FIG. 1 is fitted between the combustion liner collars of two adjacent combustors is illustrated partially in FIG. 2. It is significant that the overall length of the cross-fire tube exceeds the distance between the adjacent liner collars 28 so that when in place, the cross-fire tube 10 is spring loaded in compression.

The above described configuration imparts a resilience and flexibility to the overall cross-fire tube construction, permitting slight axial extension/compression movement as well as axial flexing or bending movements, to thereby absorb and compensate for vibrations and dynamic pressure fluctuations. The above configuration also permits connection of slightly misaligned combustion liners without undue stress on either the crossfire tubes or the liners.

Figure 4:
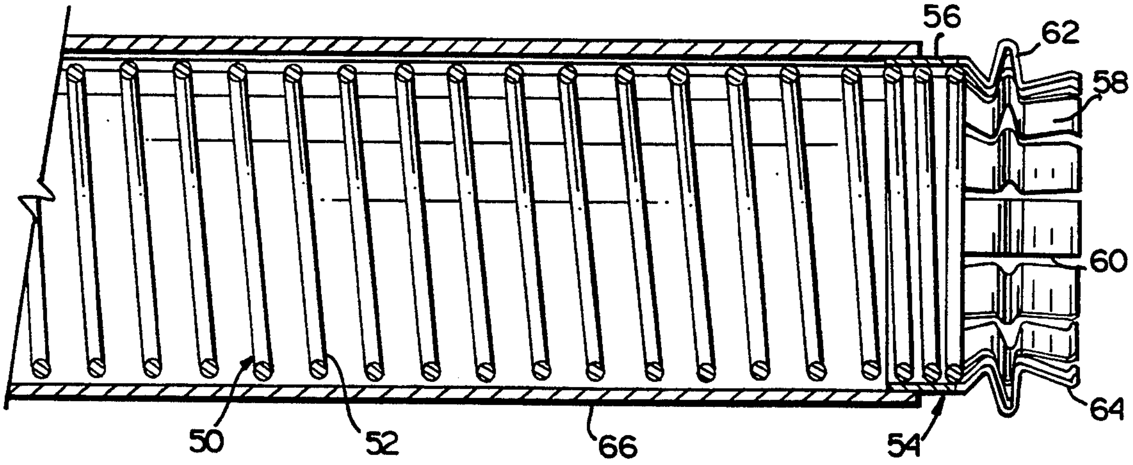
FIG. 4 is a partial side view of a cross-fire tube in accordance with a second exemplary embodiment of the invention.

Turning to FIG. 4, a second exemplary embodiment of the invention is illustrated wherein the cross-fire tube includes a main body portion 50 comprising an elongated, substantially cylindrical coil spring 52 fastened at either end to identical spring loaded connector sleeves 54. The coil spring 52 may have a diameter of about 2.75", an effective length of about 11", and be constructed of ⅛" X-750 steel wire material. These dimensions may vary, of course, for different applications of the cross-fire tubes.

The connector sleeves each comprise a substantially cylindrical portion 56 which receives the last few turns of the coil spring 52 and which is secured thereto by welding or other suitable means. Each connector sleeve also includes a plurality of annularly arrayed spring fingers 58 defined by axially extending slots or cuts 60. Each spring finger 58 is formed with an intermediate radially outwardly extending bead 62 which cause the tree end 64 of the spring finger to be biased in a radially outward direction when the connector is inserted within the collar portion of the combustor liner, i.e., each spring finger 58 will be compressed while pressing radially outwardly against the interior surface 38 of the collar 28. The connector sleeves may also be constructed of X-750 sheet, 0.032" in thickness rolled to a cylindrical shape and seam welded.

The main body portion 50 of the cross-fire tube is covered by a heat resistant ceramic cloth 66, preferably Nextel TM, (sold by DuPont), and preferably reinforced with X-750 wire. The cloth 66 may be fastened to sleeves 54 by any suitable means.

Here again, the main body portion 50 is spring loaded in compression when assembled between a pair of liners, while the connector sleeves 54 are free to bend or flex as they exert radially outwardly directed forces against the inside surface of the liner collars.

Figure 5:
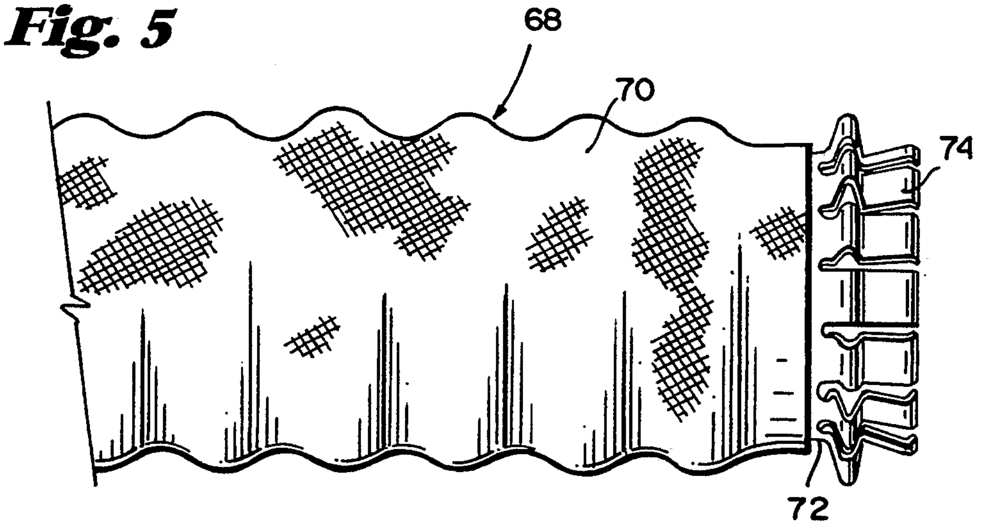
FIG. 5 is a partial side view of a cross-fire tube in accordance with a third exemplary embodiment of the invention.
Figure 6:
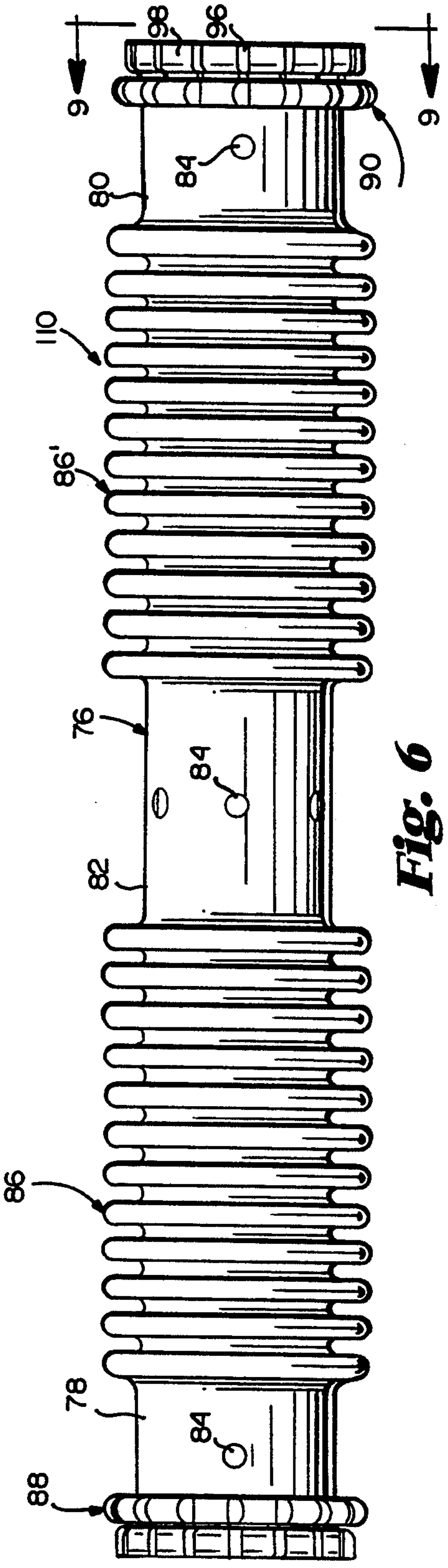
FIG. 6 is a side elevation of a cross fire tube in accordance with a fourth exemplary embodiment of the invention.
Figure 9:
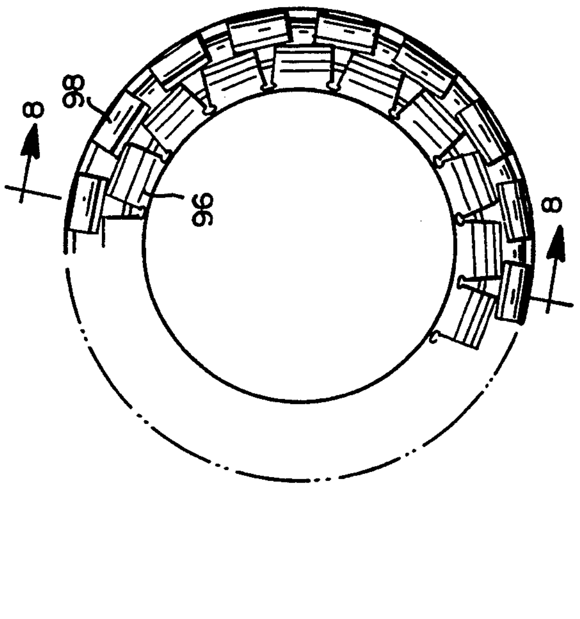
FIG. 9 is an end view of the cross-fire tube shown in FIG. 6.

Turning now to FIG. 5, a third exemplary embodiment of the invention is illustrated wherein the main body portion 68 of the cross-fire tube comprises a corrugated wire mesh fabric 70 provided at either end with identical connector sleeves 72 (similar to sleeves 54 described hereinabove with respect to the embodiment illustrated in FIG. 4). In this third exemplary embodiment, the wire mesh fabric of the main body portion 68 is constructed of X-750 wire (e.g. Inconel), preferably with a 1% open area using 0.006 wire. A preferred stiffness of the main body portion is approximately 10–12 pounds per inch.

The main body portion 68 is formed from a "sheet" of fabric which is subsequently fabricated as a corrugated tube (or bellows) and heat treated in such a way (e.g. precipitation hardening) as to insure that the main body will retain this shape at high temperatures, i.e., it will retain its corrugated or bellows shape after heat treatment, so as to impart spring characteristics thereto. Thus, the main body portion 68, which is in a normal state of compression, is able to bend, contract and expand, while the connector sleeves 72 are free to flex in radial directions while spring fingers 74 exerting radially outwardly directed forces against the inside surfaces 38 of the liner collar.

In this third embodiment, the wire mesh fabric of the main body portion also enables transpirational cooling of the cross-fire tube to occur, i.e., air flows through the mesh and forms a cool layer of air along the interior surface thereof to protect the cross-fire tube against the ignition flame passing therethrough.

Turning now to FIGS. 6–9, a fourth and presently preferred embodiment of the invention includes a cross-fire tube body 76, constructed of stainless steel, and including a pair of smooth end sections 78, 80, a smooth center section 82 and a pair of bellows sections 86, 86'. The smooth sections 78, 80 and 82 provide flat surfaces for a plurality of air holes 84 which permit air to be drawn into the cross-fire tube to control flame propagation in a conventional manner.

The bellows sections 86 and 86', in combination with a selected length for the cross-fire tube, serve to spring load the tube axially and elastically when installed between opposed combustion liner collars. In other words, the cross-fire tube is in a state of axial compression when installed, with oppositely directed axial forces exerted against the liner collars. The stiffness, or spring rate, of the bellows (86 and 86') is chosen such that the spring force exerted is greater than the weight of the tube. In this way, any liner collar movement is taken up by the bellows in high cycle fatigue, rather than resulting in relative movement (with consequent wear) at the interfaces of the tube and adjacent liner collars.

Spring finger connectors 88, 90 are provided at either end of the tube body 76, and since they are identical, only one need be described in detail. With specific reference to FIGS. 7 and 8, the connector 90 includes a radially inner spring finger body 92 and a radially outer spring finger body 94. Spring finger bodies 92, 94 are formed from flat sheet material (Inconel, for example), with individual spring fingers 96, 98, respectively, formed by axial cuts in the sheets. The sheets are then rolled to cylindrical form and placed one within the other and rotated relative to each other so that outer fingers 98 overlap adjacent inner pairs of fingers 96, as best seen in FIG. 7. In other words, by offsetting the spring finger bodies 92, 94 (and respective fingers 96, 98) in a circumferential direction, no gaps appear about the entire circumference of the spring finger assembly. The spring finger bodies 92, 94 are then inserted within the end of the cross-fire tube body 76 and spot welded in place.

With specific reference to FIGS. 7 and 8, each spring finger includes an axially extending free end 100 having a radially inwardly bent edge 102; a radially inward groove 104; a radially outward groove or flange 106 which extends radially beyond the free end 100, and a smooth, rearward section 108 which merges with the respective spring finger bodies 92, 94. The cross-fire tube 110 is inserted within a liner collar 112 as shown in FIG. 8, with the collar abutting the groove or flange 106, and radially compressing the spring fingers 96, 98 such that the latter exert a radially outward force on the liner collar 112. The spring finger connectors 88, 90 thus serve to hold the adjacent liner collars on center and, when combined with the axial force exerted by the bellows, preclude or at least minimize wear inducing relative movement at the cross-fire tube/liner collar interfaces.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cross-fire tube for attachment to liner collars of adjacent combustors in a combustion apparatus comprising an elongated, axially elastically compressible and substantially cylindrical body having connecting portions at either end thereof, each connecting portion including first spring means comprising first and second sets of annularly arranged spring fingers for exerting radially outwardly directed spring forces at least against inside surfaces of the liner collars; and wherein said first and second sets of spring fingers overlap in radial and circumferential direction.

2. The cross-fire tube according to claim 1 wherein each spring finger includes a radially outwardly directed groove which serves as a stop for axial engagement with a respective liner collar.

* * * * *